(12) United States Patent
Fujimoto et al.

(10) Patent No.: US 8,675,312 B2
(45) Date of Patent: Mar. 18, 2014

(54) MAGNETIC HEAD SUSPENSION

(71) Applicant: Suncall Corporation, Kyoto (JP)

(72) Inventors: Yasuo Fujimoto, Kyoto (JP); Eiji Okuda, Kyoto (JP)

(73) Assignee: Suncall Corporation, Kyoto-fu (JP)

( * ) Notice: Subject to any disclaimer, the term of this patent is extended or adjusted under 35 U.S.C. 154(b) by 0 days.

(21) Appl. No.: 13/861,122

(22) Filed: Apr. 11, 2013

(65) Prior Publication Data

US 2013/0271875 A1    Oct. 17, 2013

(51) Int. Cl.
*G11B 21/12* (2006.01)

(52) U.S. Cl.
USPC .................................................. 360/245.2

(58) Field of Classification Search
USPC ....................................................... 360/245.2
See application file for complete search history.

(56) References Cited

U.S. PATENT DOCUMENTS

| | | | | |
|---|---|---|---|---|
| 6,757,139 | B2 * | 6/2004 | Miyamoto | 360/256.4 |
| 6,816,343 | B1 * | 11/2004 | Oveyssi | 360/265 |
| 7,298,592 | B2 * | 11/2007 | Lee et al. | 360/265 |
| 7,414,815 | B2 * | 8/2008 | Fujimoto et al. | 360/264.7 |
| 7,684,156 | B2 * | 3/2010 | Okutomi et al. | 360/256.2 |
| 7,729,090 | B2 * | 6/2010 | Hashizume et al. | 360/256.4 |

FOREIGN PATENT DOCUMENTS

JP    62-279570    12/1987

* cited by examiner

*Primary Examiner* — Mark Blouin
(74) *Attorney, Agent, or Firm* — Sterne, Kessler, Goldstein & Fox P.L.L.C.

(57) ABSTRACT

Assuming that a length in the suspension longitudinal direction between a distal edge of a supporting part and a dimple is represented by "L", plural load beam part welding points at which spot welding are made for fixing a load beam part fixed region of a flexure base plate to a plate-like main body portion of a load beam part include paired right and left main welding points that are arranged symmetrically to each other with respect to a suspension longitudinal center line and that are disposed within a center region away from the distal edge of the supporting part by more than or equal to 0.4*L and less than or equal to 0.6*L.

13 Claims, 10 Drawing Sheets

MAGNETIC HEAD SUSPENSION

BACKGROUND OF THE INVENTION

1. Field of the Invention

The present invention relates to a magnetic head suspension for supporting a magnetic head slider that reads and/or writes data from and to a recording medium such as a hard disk drive.

2. Related Art

A magnetic head suspension that supports a magnetic head slider is required to accurately and quickly have the magnetic head slider positioned onto a center of a target track.

More specifically, the magnetic head suspension is directly or indirectly connected at a proximal side to an actuator such as a voice coil motor, and has the magnetic head slider, which is supported at a distal side, positioned onto the target track by being swung around a swing center by the actuator.

In order to accurately and quickly position the magnetic head slider onto the target track, a vibration of the magnetic head slider has to be reduced as much as possible even if a frequency of a diving signal for the actuator is increased.

Japanese Unexamined Patent Publication No. 62-279570 (hereinafter referred to as prior art document 1) discloses a load beam part that has a plate-like main body portion disposed parallel to a disk surface and paired right and left flange portions bent from side edges of the main body portion toward a direction away from the disk surface, wherein the main body portion is provided with an auxiliary flange so that the rigidity of the load beam part is increased.

The configuration disclosed by the prior art document 1 is useful in that a resonance frequency can be effectively increased since the rigidity of the load beam part can be increased without mass increase.

However, formation of the auxiliary flange requires an additional manufacturing process, which results in a problem of cost increase due to increase of manufacturing process and necessity of a dedicated die.

SUMMARY OF THE INVENTION

The present invention has been made in view of the above conventional art, and it is an object thereof to provide a magnetic head suspension capable of enhancing the rigidity while preventing mass increase and cost increase as much as possible.

In order to achieve the object, a first aspect of the present invention provides a magnetic head suspension including a supporting part that is swung around a swing center in a seek direction parallel to a disk surface directly or indirectly by an actuator, a load bending part that has a proximal end portion connected to the supporting part and generates a pressing load for pressing a magnetic head slider toward the disk surface, a load beam part that has a proximal end portion supported through the load bending part by the supporting part and transmits the pressing load to the magnetic head slider through a dimple provided at a distal side thereof, and a flexure part that is fixed to the load beam part and the supporting part while supporting the magnetic head slider, wherein the load beam part has a plate-like main body portion that is disposed substantially parallel to the disk surface, wherein flexure part has a plate-like flexure base plate that is disposed substantially parallel to the disk surface, wherein the flexure base plate includes a load beam part fixed region that is fixed to a disk-facing surface of the main body portion, wherein the load beam part fixed region and the main body portion are fixed to each other by spot welding at plural load beam part welding points, and wherein assuming that a length it the suspension longitudinal direction between a distal edge of the supporting part and the dimple is represented by "L", the plural load beam part welding points include paired right and left main welding points that are arranged symmetrically to each other with respect to the suspension longitudinal center line and that are disposed within a center region away from the distal edge of the supporting part by more than or equal to 0.4*L and less than or equal to 0.6*L.

The magnetic head suspension according to the first aspect of the present invention makes it possible to bend a combined component of the load beam part and the flexure base plate so as to be convex in a direction perpendicular to the disk surface without involving an additional manufacturing process.

Accordingly, the rigidity of the magnetic head suspension can be enhanced while preventing mass increase and cost increase as much as possible.

In particular, in the magnetic head suspension according to the first aspect of the present invention, the component is largely bent at the center region.

Accordingly, a resonant frequency in the first bending mode and a resonant frequency in the first torsion mode can be effectively raised, whereby resonant vibrations in the first bending mode and the first torsion mode can be effectively prevented at the time when the magnetic head slider is moved onto the target track by the actuator such as the voice coil motor.

Preferably, the plural load beam part welding points may include paired right and left load beam part proximal-side welding points that are disposed on the proximal side of the paired main welding points in the suspension longitudinal direction and that are arranged symmetrically to each other with respect to the suspension longitudinal center line.

In a first mode, the spot welding at the paired main welding points are made from a side of one of the flexure base plate or the main body portion, while the spot welding at the paired load beam part proximal-side welding points are made from a side of the other one of the flexure base plate or the main body portion.

In a second mode, the spot welding at the paired main welding points and the spot welding at the paired load beam part proximal-side welding points are made from the same side of the flexure base plate or the main body portion.

In the first and second modes, the spot welding at the paired main welding points are preferably made from the side of the flexure base plate.

Preferably, the plural load beam part welding points may include a center welding point that is arranged on the center line and at which the spot welding is made from the same side as the spot welding at the paired main welding points.

In a first configuration, the center welding point is arranged on the same position as the paired main welding points in the suspension longitudinal direction.

In a second configuration, the center welding point is displaced from the paired main welding points in the suspension longitudinal direction.

In this case, the spot welding at the paired main welding points is set to have weld strength higher than that at the center welding point.

In the second configuration, the center welding point may preferably include a distal-side center welding point and a proximal-side center welding point that are displaced from the paired main welding points toward the distal side and the proximal side in the suspension longitudinal direction, respectively.

In this case, the distal-side and proximal-side center welding points are arranged symmetrically to each other with respect to an imaginary line passing the main welding points.

In order to achieve the object, a second aspect of the present invention provides a magnetic head suspension including a supporting part that is swung around a swing center in a seek direction parallel to a disk surface directly or indirectly by an actuator, a load bending part that has a proximal end portion connected to the supporting part and generates a pressing load for pressing a magnetic head slider toward the disk surface, a load beam part that has a proximal end portion supported through the load bending part by the supporting part and transmits the pressing load to the magnetic head slider through a dimple provided at a distal side thereof, and a flexure part that is fixed to the load beam part and the supporting part while supporting the magnetic head slider, wherein the load beam part has a plate-like main body portion that is disposed substantially parallel to the disk surface, wherein flexure part has a plate-like flexure base plate that is disposed substantially parallel to the disk surface, wherein the flexure base plate includes a load beam part fixed region that is fixed to a disk-facing surface of the main body portion, wherein the load beam part fixed region and the main body portion are fixed to each other by spot welding at plural load beam part welding points, and wherein assuming that a length in the suspension longitudinal direction between a distal edge of the supporting part and the dimple is represented by "L", the plural load beam part welding points includes a center welding point that is arranged on a suspension longitudinal center line and that is disposed within a center region away from the distal edge of the supporting part by more than or equal to 0.4*L and less than or equal to 0.6*L, paired right and left distal-side welding points that are positioned on the distal side of the center welding point and that are arranged symmetrically to each other with respect to the suspension longitudinal center line, and paired right and left proximal-side welding points that are positioned on the proximal side of the center welding point and that are arranged symmetrically to each other with respect to the suspension longitudinal center line, wherein the paired distal-side welding points and the paired proximal-side welding points are arranged symmetrically to each other in the suspension longitudinal direction with respect to the center welding point, and wherein the spot welding at the center welding point, the paired distal-side welding points and the paired proximal-side welding points are made from the same side of the flexure base plate or the main body portion.

The magnetic head suspension according to the second aspect of the present invention makes it also possible to bend the combined component of the load beam part and the flexure base plate so as to be convex in the direction perpendicular to the disk surface without involving an additional manufacturing process.

Accordingly, the rigidity of the magnetic head suspension can be enhanced while preventing mass increase and cost increase as much as possible.

In particular, in the magnetic head suspension according to the second aspect of the present invention, the component is also largely bent at the center region.

Accordingly, a resonant frequency in the first bending mode and a resonant frequency in the first torsion mode can be effectively raised, whereby resonant vibrations in the first bending mode and the first torsion mode can be effectively prevented at the time when the magnetic head slider is moved onto the target track by the actuator such as the voice coil motor.

Preferably, the plural load beam part welding points may include paired right and left load beam part proximal-side welding points that are disposed on the proximal side of the paired proximal-side welding points in the suspension longitudinal direction and that are arranged symmetrically to each other with respect to the center line.

In a first mode, the spot welding at the center welding point, the paired distal-side welding points and the paired proximal-side welding points are made from a side of one of the flexure base plate or the main body portion, while the spot welding at the load beam part proximal-side welding points are made from a side of the other one of the flexure base plate or the main body portion.

In a second mode, the spot welding at the center welding point, the paired distal-side welding points, the paired proximal-side welding points and the paired load beam part proximal-side welding points are made from the same side of the flexure base plate or the main body portion.

In any one of the various configurations, the load bending part may include paired right and left leaf springs that have plate surfaces facing the disk surface and that are disposed away from each other in the suspension width direction, and the flexure base plate may include a supporting part fixed region that is fixed to the supporting part by spot welding at plural supporting part welding points in a state of being brought into contact with a disk-facing surface of the supporting part, and a non-fixed region that extends between the paired leaf springs in the suspension width direction and that connects the load beam part fixed region and the supporting part fixed region.

In this case, preferably, the paired load beam part proximal-side welding points are arranged at an area of the load beam part fixed region that is adjacent to the non-fixed region, and the supporting part welding points include paired right and left supporting part distal-side welding points at which an area of the supporting part fixed region that is adjacent to the non-fixed region and the supporting part are welded to each other.

DETAILED DESCRIPTION OF THE PREFERRED EMBODIMENTS

First Embodiment

Hereinafter, a preferred embodiment of a magnetic head suspension according to the present invention will be described, with reference to the attached drawings.

Figure 1:
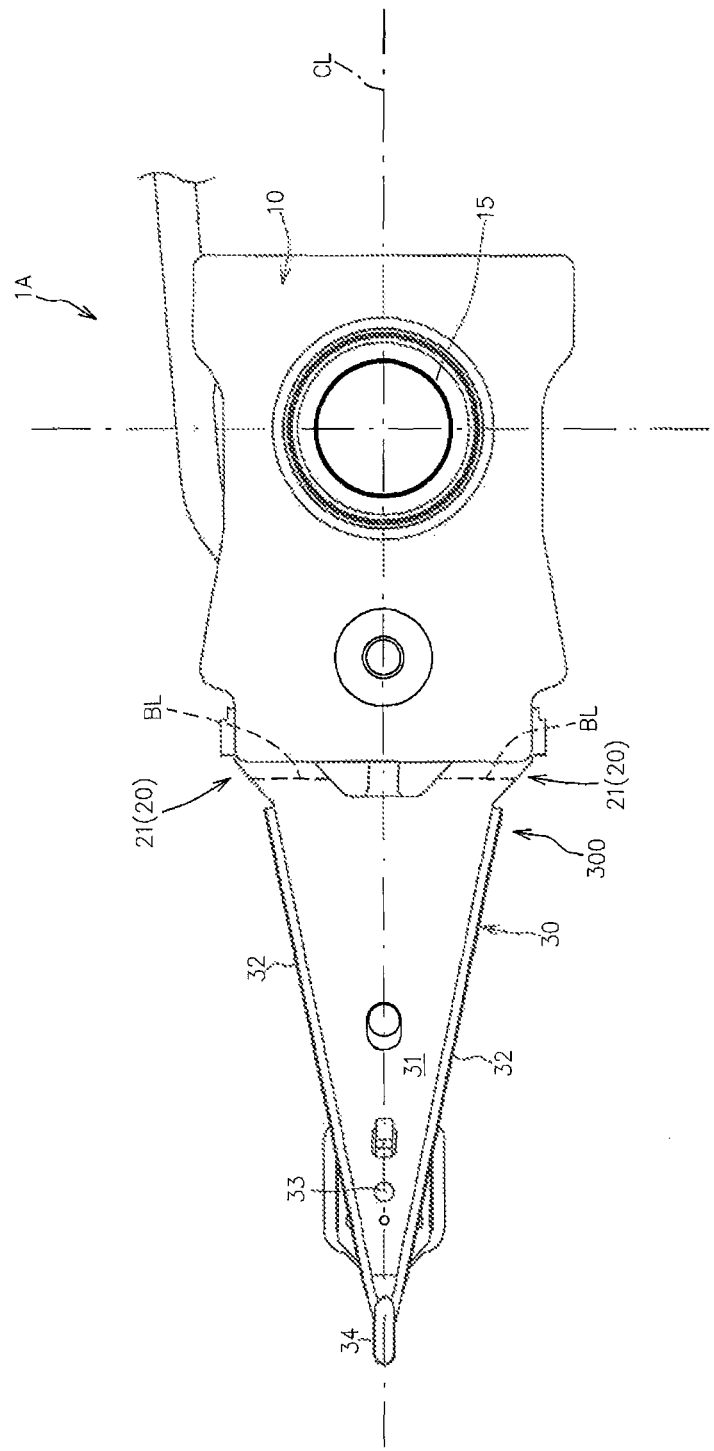
FIG. 1 is a top view of a magnetic head suspension according to a first embodiment of the present invention.
Figure 2:
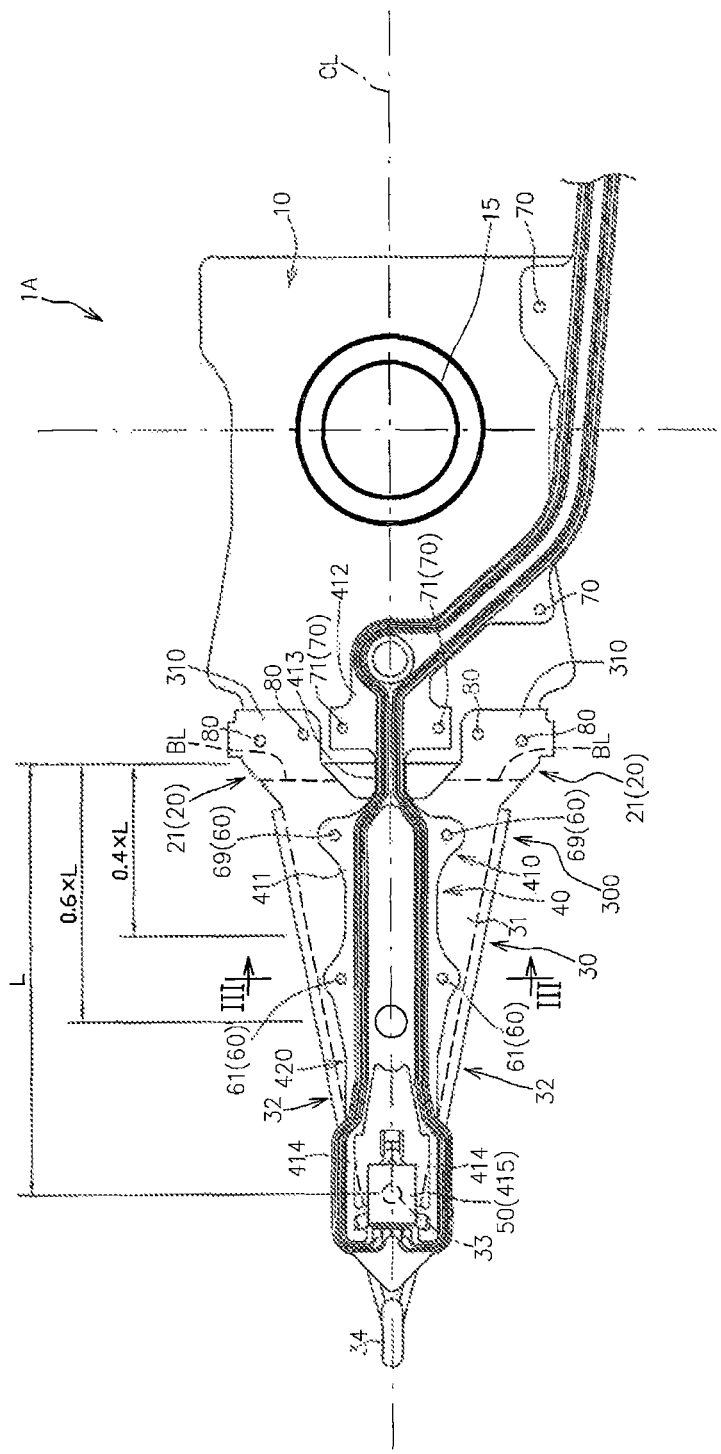
FIG. 2 is a bottom view of the magnetic head suspension according to the first embodiment.

FIGS. 1 and 2 are a top view (a plan view as viewed from a side opposite from a disk surface) and a bottom view (a bottom plan view as viewed from a side close to the disk surface) of a magnetic head suspension 1A according to the present embodiment, respectively.

As shown in FIGS. 1 and 2, the magnetic head suspension 1A includes a supporting part 10 that is swung in a seek direction parallel to the disk surface directly or indirectly by an actuator (not shown) such as a voice coil motor, a load bending part 20 that is connected at a proximal end portion to the supporting part 10 so as to generate a load for pressing a magnetic head slider 50 toward the disk surface, a load beam part 30 that is supported through the load bending part 20 by the supporting part 10 and transmits the load to the magnetic head slider 50, and a flexure part 40 that is supported by the load beam part 30 and the supporting part 10 while supporting the magnetic head slider 50.

The supporting part 10 is a member for supporting the load beam part 30 through the load bending part 20 while being directly or indirectly connected to the actuator, and is therefore made to have a relatively high rigidity.

In the present embodiment, the supporting part 10 is formed as a base plate including a boss portion 15 to which a distal end of a carriage arm (not shown) is joined by swage processing, the carriage arm being connected to the main actuator, as shown in FIGS. 1 and 2.

The supporting part 10 may be preferably made from, for example, a stainless steel plate having a thickness of 0.1 mm to 0.8 mm.

It is of course possible to adopt as the supporting part 10 an arm having a proximal end that is connected to the swing center of the main actuator.

As described above, the load beam part 30 is a member for transmitting the load generated by the load bending part 20 to the magnetic head slider 50, and therefore is required to have a predetermined rigidity.

The load beam part 30 has a plate-like main body portion 31 that is disposed substantially parallel to the disk surface and to which the flexure part 40 is fixed.

Figure 3:
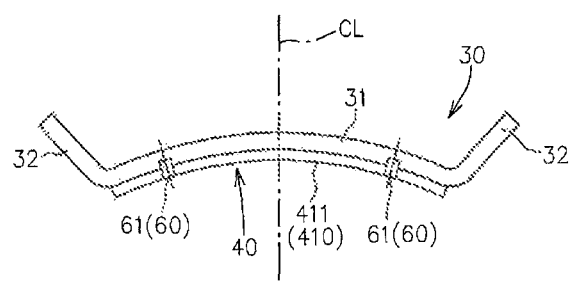
FIG. 3 is a cross sectional view taken along line III-III in FIG. 2.

In the present embodiment, as shown in FIGS. 1 to 3, the toad beam part 30 further includes paired right and left flange portions 32 that extend from both side edges of the main body portion 31 in a suspension width direction toward a direction opposite from the disk surface, in order to enhance the rigidity.

The load beam part 30 may be preferably made from, for example, a stainless steel plate having a thickness of 0.02 mm to 0.1 mm.

The main body portion 31 is formed, at its distal end section, with a protrusion that is so-called dimple 33, as shown in FIGS. 1 and 2.

The dimple 33 is protruded by, for example, about 0.05 mm to 0.1 mm, in a direction toward the disk surface. The dimple 33 is brought into contact with an upper surface (a reverse surface opposite from a supporting surface that supports the magnetic head slider 50) of a head-mounting region 415 of the flexure part 40, which is mentioned below.

The pressing load is transmitted to the head-mounting region 415 of the flexure part 40 through the protrusion 33.

In the present embodiment, as shown in FIGS. 1 and 2, the load beam part 30 further integrally includes a lift tab 34 that extends from a distal end of the main body portion 31 toward the distal side in the suspension longitudinal direction. The lift tab 34 is a member that engages with a lamp provided in a magnetic disk device so as to cause the magnetic head slider 50 to be away from the disk surface in the z direction perpendicular to the disk surface at the time when the magnetic head suspension 1A is swung by the main actuator so that the magnetic head slider 50 is positioned outward from the disk surface in a radial direction.

In the present embodiment, as shown in FIGS. 1 and 2, both sides of the main body portion 31 of the load beam part 30 are inclined substantially linearly so as to come closer to a suspension longitudinal center line CL as they go from the proximal side to the distal side.

The configuration makes it possible to reduce the moment of inertia of the distal side of the load beam part 30 around the center line CL, thereby increasing resonant frequencies of the torsion mode and the bending mode.

The load bending part 20 can be formed in various shapes as long as it generates the pressing load in accordance with its self-elastic deformation.

In the present embodiment, as shown in FIGS. 1 and 2, the load bending part 20 includes paired right and left leaf springs 21 that have plate surfaces facing the disk surface and that are disposed away from each other in the suspension width direction.

The paired leaf springs 21 are bent at bending line BL so that their distal sides are closer to the disk surface, as shown in FIGS. 1 and 2.

The pressing load can be set to a predetermined value by adjusting a position of the bending line BL in a suspension longitudinal direction and/or a bending angle at the bending line BL.

Specifically, the paired leaf springs 21 are elastically bent at the bending line BL in such a direction as to cause their distal sides to come closer to the disk surface before the magnetic head suspension 1 is mounted to the magnetic disk device.

When the magnetic head suspension 1A is assembled into the hard disk drive, the bending at the bending line BL is bent back and elastically deformed so that the magnetic head slider 50 is positioned onto the disk surface of the hard disk drive.

Further, when the hard disk drive is shifted to an operating condition to rotate the disk surface, the magnetic head slider 50 receives an air pressure caused by the rotation of the disk surface to float in the direction opposite from the disk surface. The floating motion of the magnetic head slider 50 causes the bending at the bending line BL to be further bent back and further elastically deformed.

More specifically, the leaf springs 21 are changed to a condition that has a retained elasticity, which has been generated by the elastic deformation at the time when the magnetic head suspension 1A is assembled into the hard disk drive as well as the elastic deformation at the time when the magnetic head slider 50 floats in response to the rotation of the disk surface, the retained elasticity functioning as the pressing load.

The leaf springs 21 are made from a stainless steel plate having a thickness of 0.02 mm to 0.1 mm, for example.

In the present embodiment, the paired leaf springs 21 are integrally formed with the load beam part 30, as shown in FIGS. 1 and 2.

That is, the magnetic head suspension 1A according to the present embodiment includes a load beam part/load bending part component 300 that integrally forms the load beam part 30 and the paired leaf springs 21.

As shown in FIG. 2, the component 300 integrally includes the load beam part 30, the paired leaf springs 21 extending from the both sides of the main body portion 31 of the load beam part 30 in the suspension width direction toward the proximal side in the suspension longitudinal direction, and paired supporting part fixed region 310 extending from the paired leaf springs 21 toward the proximal side in the suspension longitudinal direction, respectively.

As shown in FIG. 2, the component 300 is connected to the supporting part 10 by spot welding at plural welding points 80 in a state where the paired supporting part fixed region 310 are brought into contact with a disk-facing surface of the supporting part 10 at the distal side.

Preferably, the spot welding can be preferably made from a side of the component 300, which can facilitate the welding operation.

The flexure part 40 includes a plate-like flexure base plate 410 disposed substantially parallel to the disk surface, the base plate having the head-mounting region 415 and another region fixed to the load beam part 30 and the supporting part 10 by spot welding.

More specifically, as shown in FIG. 2, the flexure base plate 410 includes a load beam part fixed region 411, a supporting part fixed region 412, non-fixed region 413, paired supporting pieces 414 and the head-mounting region 415. The load beam part fixed region 411 is fixed to the main body portion 31 by spot welding at plural load beam part welding points 60 in a state of being brought into contact with the disk-facing surface of the main body portion 31. The supporting part fixed region 412 is fixed to the supporting part 10 by spot welding at plural supporting part welding points 70 in a state of being brought into contact with the disk-facing surface of the supporting part 10. The non-fixed region 413 extends between the load beam part fixed region 411 and the supporting part fixed region 412. The paired supporting pieces 414 extend from both sides of the load beam part fixed region 411 in the suspension width direction toward the distal side in the suspension longitudinal direction. The head-mounting region 415 is supported by the paired supporting pieces 414.

Figure 4:
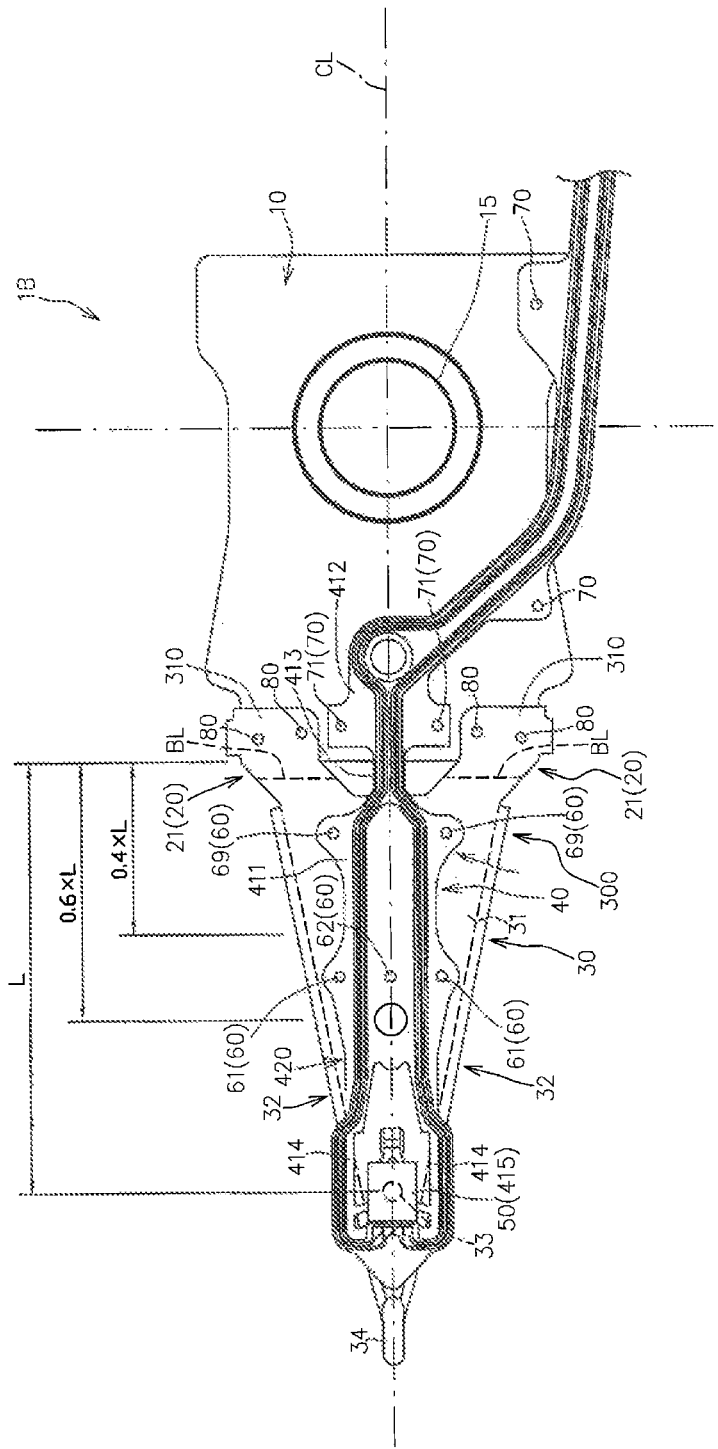
FIG. 4 is a bottom view of a magnetic head suspension according to a first modified example of the first embodiment.

The head-mounting region 415 supports the magnetic head slider 50 at its lower surface that faces the disk surface, as shown in FIG. 4.

As explained earlier, the dimple 33 is brought into contact with the upper surface of the head-mounting region 415, so that the head-mounting region 415 could sway flexibly in a roll direction and in a pitch direction, with the dimple 33 functioning as a fulcrum.

The flexure base plate 410 has rigidity lower than that of the load beam part 30, so that the head-mounting region 415 could sway in the roll direction and in the pitch direction.

The flexure metal plate 410 may be made from, for example, a stainless steel plate having a thickness of 0.01 mm to 0.025 mm.

As shown in FIG. 2, in the present embodiment, the flexure part 40 is integrally provided with a wiring structure 420 for electrically connecting the magnetic head slider 50 to an outside member.

More specifically, the wiring structure may include an insulating layer laminated on the lower surface of the flexure base plate 410 that faces the disk surface, and a signal wiring laminated on a surface of the insulating layer that faces the disk surface.

Preferably, the signal wiring may include an insulative cover layer enclosing the signal wiring.

The plural welding points 60 and 70 at which the flexure base plate 410 is spot-welded to the main body portion 31 and the supporting part 10, respectively, will now be explained.

As shown in FIG. 2, assuming that a length in the suspension longitudinal direction between a distal edge of the supporting part 10 (that is, a boundary line between the supporting part 10 and the paired leaf springs 21) and the dimple 33 is represented by "L", the plural load beam part welding points 60 includes paired right and left main welding points 61 that are arranged symmetrically to each other with respect to the suspension longitudinal center line CL and that are disposed within a center region away from the distal edge of the supporting part 10 by more than or equal to 0.4*L and less than or equal to 0.6*L.

In a case where first and second plate-like members are overlapped to each other, if spot welding at plural welding points are made on a side of one (for example, the first plate-like member) of the two plate-like members, the first and second plate-like members are contracted along a direction connecting the plural welding points. In this case, the first plate-like member on which the spot welding is made is contracted larger than the second plate-like member.

As shown in FIG. 2, in the present embodiment, the spot welding at the paired main welding points 61 is made from a side of the flexure base plate 410.

In this case, the flexure base plate 410 (the load beam part fixed region 411) is contracted along the suspension width direction, which is a direction along a line passing the paired main welding points 61, larger than the main body portion 31.

As a result, a combined component made by the load beam part 30 and the flexure base plate 410 is bent so as to be convex toward a direction opposite from the disk surface.

FIG. 3 is a cross sectional view taken along line in FIG. 2, and shows a cross section taken along a cutting plane passing the paired main welding points 61.

By fixing the flexure base plate 410 and the main body portion 31 by the spot welding at the paired main welding points 61, the combined component of the load beam part 30 and the flexure base plate 410 can be bent as shown in FIG. 3, thereby enhancing the rigidity of the magnetic head suspension 1A without mass increase. Accordingly, the resonant frequency of the magnetic head suspension 1A can be raised.

In the present embodiment, the spot welding at the paired main welding points 61 are made from a side of the flexure base plate 410. In this case, the combined component of the load beam part 30 and the flexure base plate 410 is bent so as to be convex toward the direction opposite from the disk surface, as described earlier.

Further, in the present embodiment, the paired main welding points 61 are disposed within the center region of the load beam part 30 in the suspension longitudinal direction, as explained above.

The configuration causes the load beam part 30 to be bent largely at the center region, thereby effectively enhancing the rigidity of the center region.

Accordingly, the resonant frequency of the first bending mode as well as the resonant frequency of the first torsion mode can be effectively raised.

More specifically, in the vibration in the first bending mode, in a state where the distal edge of the supporting part 10 (that is, the boundary between the supporting part 10 and the load bending part 20) and the dimple 33 function as a supporting point (that is, in the state where the distal edge of the supporting part 10 and the dimple 33 are fixed so as not to be displaced in the z direction perpendicular to the disk surface), the load beam part 30 is bent along the z direction. In the vibration, a center area between the two supporting points in the suspension longitudinal direction has a maximum amplitude.

During vibration of the first torsion mode, the load beam part 30 is twisted about an imaginary line passing a center, in the suspension width direction, of the distal edge of the supporting part 10 and the dimple 33. During vibration, a center area between the distal edge of the supporting part 10 and the dimple 33 has a maximum amplitude.

Accordingly, by arranging the paired main welding points 61 within the center region that is away from the distal edge of the supporting part 10 by more than or equal to 0.4*L and less than or equal to 0.6*L, the resonant frequency in the first bending mode as well as the resonant frequency in the first torsion mode can be effectively raised.

As shown in FIG. 2, in the present embodiment, the load beam part fixed region 411 and the main body portion 31 are also fixed to each other by spot welding at paired right and left load beam part proximal-side welding points 69 that are arranged symmetrically to each other with respect to the suspension longitudinal center line CL and that are disposed on a proximal side of the paired main welding points 61 in the suspension longitudinal direction.

The configuration makes it possible to also bend the combined component of the load beam part 30 and the flexure base plate 410 on a proximal side of the paired main welding points 61 in the suspension longitudinal direction.

In the present embodiment, the spot welding at the paired load beam part proximal-side welding points 69 are made on the same side as the spot welding at the main welding points 61, as shown in FIG. 2.

More specifically, the spot welding at the paired main welding points 61 are made from a side of the flexure base plate 41 as described above. Therefore, the spot welding at the paired load beam part proximal-side welding points 69 are also made from a side of the flexure base plate 410.

In the present embodiment, the load bending part 20 is embodied by the paired leaf springs 21 that are disposed away from each other in the suspension width direction, as described above.

In this case, the non-fixed region 413 extending between the load beam part fixed region 411 and the supporting part fixed region 412 is preferably disposed between the paired leaf springs 21 in the suspension width direction, as shown in FIGS. 1 and 2.

The configuration makes it possible to effectively prevent the non-fixed region 413 from affecting the elastic motion of the paired leaf springs 21, thereby preventing fluctuation of the pressing load.

In a more preferable configuration, as shown in FIG. 2, the paired load beam part proximal-side welding points 69 are arranged at an area of the load beam part fixed region 411 that is adjacent to the non-fixed region 413, and an area of the supporting part fixed region 412 that is adjacent to the non-fixed region 413 is fixed to the supporting part 10 by spot welding at paired right and left welding points.

The configuration makes it possible to effectively prevent a gap between the load beam part fixed region 411 and the main body portion 31 and also a gap between the supporting part fixed region 412 and the supporting part 10 when the paired leaf springs 21 are elastically deformed. Accordingly, a vibration mainly due to the non-fixed region 413 ("flapping motion" of the non-fixed region 413) can be effectively prevented.

Preferably, the load beam part fixed region 411 and the main body portion 31 are fixed to each other also by spot welding at a center welding point 62 disposed on the center line, the spot welding at the center welding point 62 being made from the same side as the spot welding at the paired main welding points 61.

That is, the plural load beam part welding points 60 further includes the center welding point 62 that is arranged on the center line CL and at which the spot welding is made from the same side as the spot welding at the paired main welding points 61.

Figure 5:
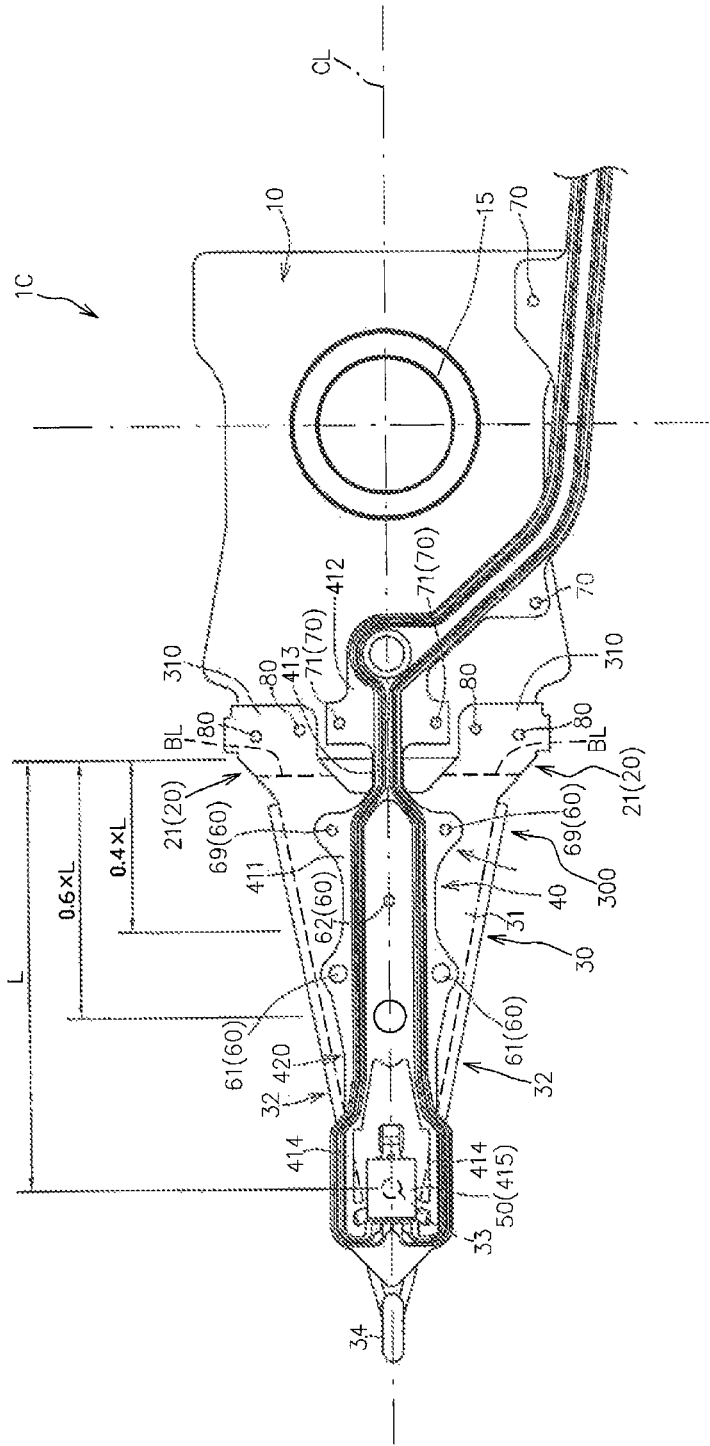
FIG. 5 is a bottom view of a magnetic head suspension according to a second modified example of the first embodiment.
Figure 6:
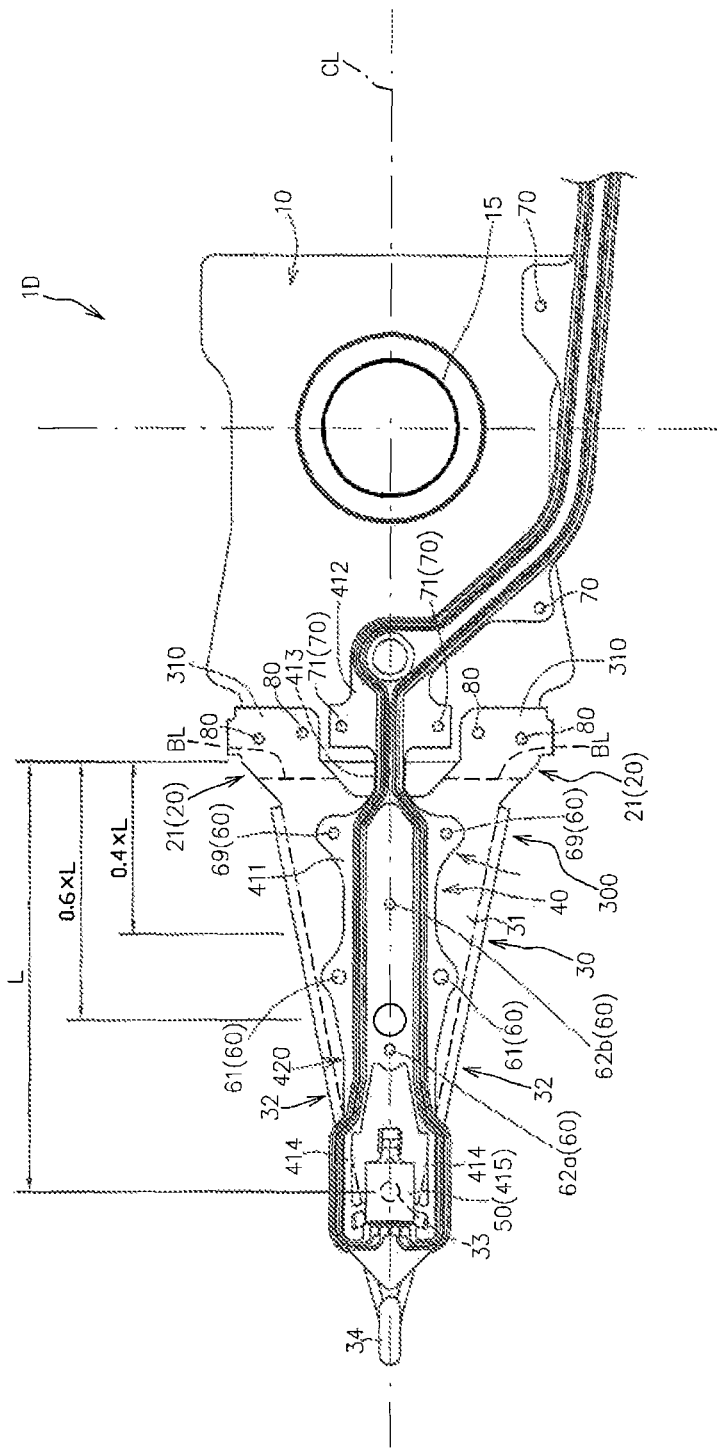
FIG. 6 is a bottom view of a magnetic head suspension according to a third modified example of the first embodiment.

FIGS. 4 to 6 are bottom views of the magnetic head suspensions 1B, 1C and 1D according to first to third modified examples of the present embodiment.

As shown in FIG. 4, in the first modified example 1B, the center welding point 62 is arranged at the same position as the paired main welding points 61 in the suspension longitudinal direction.

The configuration makes it possible to make an amount of contraction of the load beam part fixed region 411 along an imaginary line passing the paired main welding points 61 and the center welding point 62 much larger than that of the main body portion 31, thereby largely bending the combined component of the load beam part 30 and the flexure base plate 410.

As shown in FIG. 5, in the second modified example 1C, the center welding point 62 is displaced from the paired main welding points 61 in the suspension longitudinal direction.

In this example, the spot welding at the paired main welding points 61 are set to have weld strength higher than that at the center welding point 62.

In the figure, weld strength is represented by size of the circle showing the welding point.

The configuration can also largely bend the combined component of the load beam part 30 and the flexure base plate 410.

In the example shown in FIG. 5, the center welding point 62 is arranged at a center between the paired main welding points 61 and the paired load beam part proximal-side welding points 69 in the suspension longitudinal direction.

The configuration makes it possible to enhance degree of adhesion between the load beam part 30 and the flexure base plate 410 while largely bending the combined component of the load beam part 30 and the flexure base plate 410.

As shown in FIG. 6, in the third modified example 1D, the center welding point 62 includes a distal-side center welding point 62a and a proximal-side center welding point 62b displaced from the paired main welding points 61 toward the distal side and the proximal side in the suspension longitudinal direction, respectively.

The distal-side and proximal-side center welding points 62a, 62b are arranged symmetrically to each other with respect to an imaginary line passing the main welding points 61.

The configuration also makes it possible to enhance degree of adhesion between the load beam part 30 and the flexure base plate 410 while largely bending the combined component of the load beam part 30 and the flexure base plate 410.

In a more preferable configuration, the proximal-side center welding point 62b is arranged at the center in the suspension longitudinal direction between paired main welding points 61 and the paired load beam part proximal-side welding points 69.

in the present embodiment, the spot welding at the paired main welding points 61 are made from a side of the flexure base plate 410 in consideration of workability of the welding operation. However, alternatively, the spot welding at the paired main welding points 61 may be made from a side of the main body portion 31.

in this case, the combined component of the load beam part 30 and the flexure base plate 410 is bent so as to be convex toward the disk surface.

Second Embodiment

Hereinafter, another embodiment of the magnetic head suspension according to the present embodiment will be explained, with reference to the attached drawing.

Figure 7:
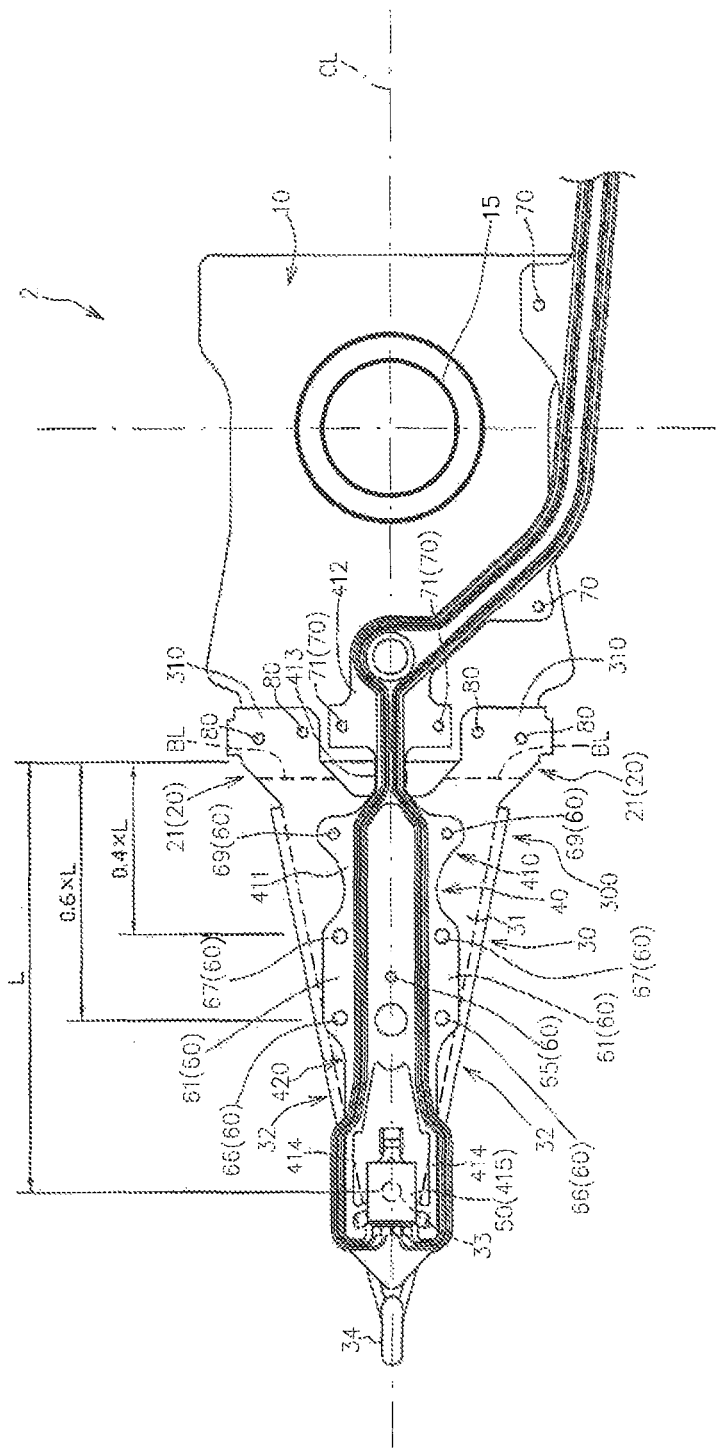
FIG. 7 is a bottom view of a magnetic head suspension according to a second embodiment of the present invention.

FIG. 7 is a bottom view of a magnetic head suspension 2 according to the present embodiment.

In the figure, the components same as those in the first embodiment are denoted by the same reference numerals to omit the detailed description thereof.

In the magnetic head suspension 1A according to the first embodiment and the first to third modified examples 1B to 1D, the main welding points 61 are arranged within the center region.

On the other hand, in the magnetic head suspension 2 according to the present embodiment, a center welding point 65 is arranged within the center region.

More specifically, in the present embodiment, the plural load beam part welding points 60 includes the center welding point 65 that is arranged on the suspension longitudinal center line CL and that is positioned within the center region away from the distal edge of the supporting part 10 by more than or equal to 0.4*L and less than or equal to 0.6*L.

In the present embodiment, the plural load beam part welding points 60 further includes paired right and left distal-side welding points 66 that are positioned on the distal side of the center welding point 65 and that are arranged symmetrically to each other with respect to the suspension longitudinal center line CL, and paired right and left proximal-side welding points 67 that are positioned on the proximal side of the center welding point 65 and that are arranged symmetrically to each other with respect to the suspension longitudinal center line CL.

The paired distal-side welding points 66 and the paired proximal-side welding points 67 are arranged symmetrically to each other in the suspension longitudinal direction with respect to the center welding point 65.

The spot welding at the center welding point 65, the spot welding at the paired distal-side welding points 66 and the spot welding at the paired proximal-side welding points 67 are made from the same side of the flexure base plate 410 or the main body portion 31.

The present embodiment also can enhance the rigidity of the magnetic head suspension 2 without increase of the manufacturing process and increase of the mass, thereby raising the resonant frequency, especially the resonant frequencies of the first bending mode and the first torsion mode, of the magnetic head suspension 2.

As shown in FIG. 7, the spot welding at the welding points 65, 66, 67 are made from the side of the flexure base plate 410. Alternatively, the spot welding at the welding points 65, 66, 67 may be made from the side of the main body portion 31.

As shown in FIG. 7, the load beam part fixed region 411 and the main body portion 31 are fixed to each other also by the spot welding at the paired load beam part proximal-side welding points 69 in the same manner as the first embodiment.

In the present embodiment, the paired load beam part proximal-side welding points 69 are arranged on the proximal side of the proximal-side welding points 67 in the suspension longitudinal direction.

As shown in FIG. 7, in the present embodiment, the spot welding at the paired load beam part proximal-side welding points 69 are made from the same side as the spot welding at the center welding point 65, the spot welding at the paired distal-side welding points 66, and the spot welding at the proximal-side welding points 67.

That is, the spot welding at the welding points 65, 66, 67 are made from the side of the flexure base plate 410. Accordingly, the spot welding at the paired load beam part proximal-side welding points 69 are also made from the side of the flexure base plate 410.

Third Embodiment

Hereinafter, still another embodiment of the magnetic head suspension according to the present embodiment will be explained, with reference to the attached drawings.

Figure 8:
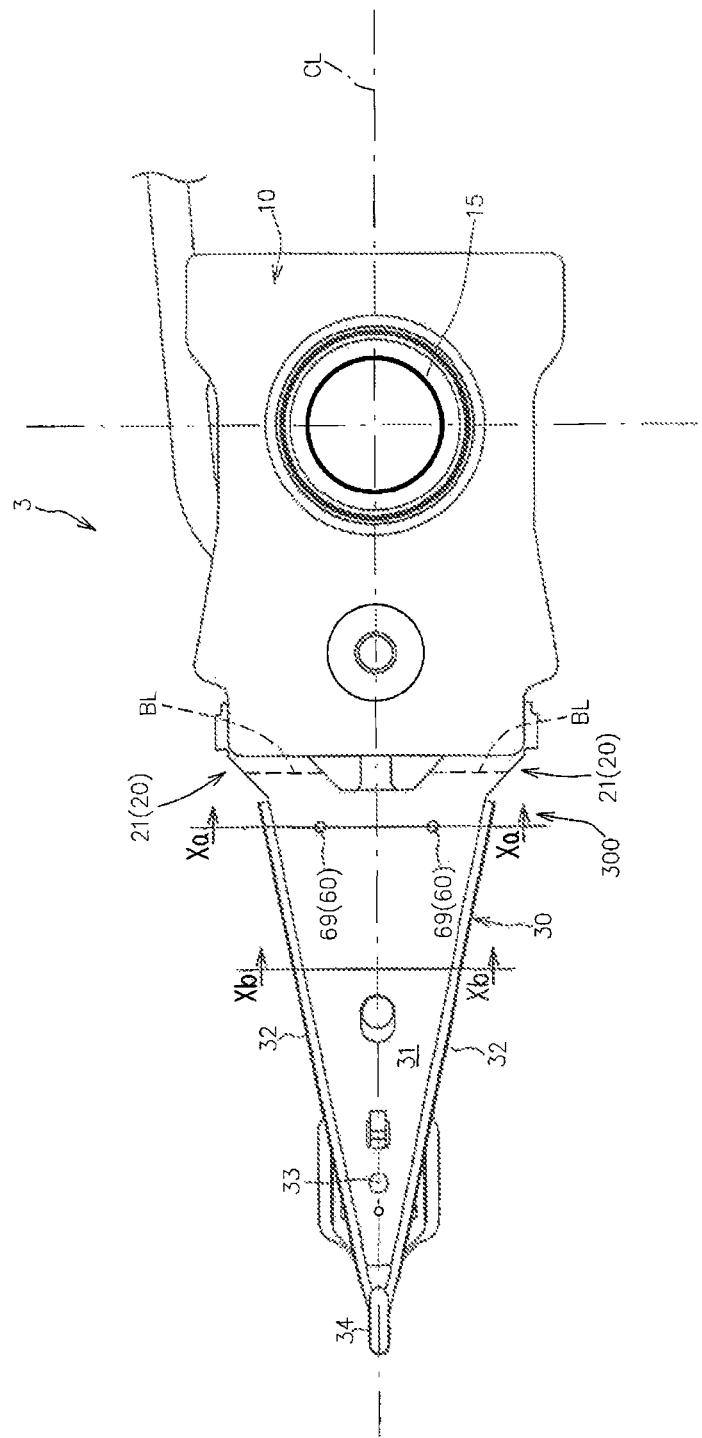
FIG. 8 is a top view of a magnetic head suspension according to a third embodiment of the present invention.
Figure 9:
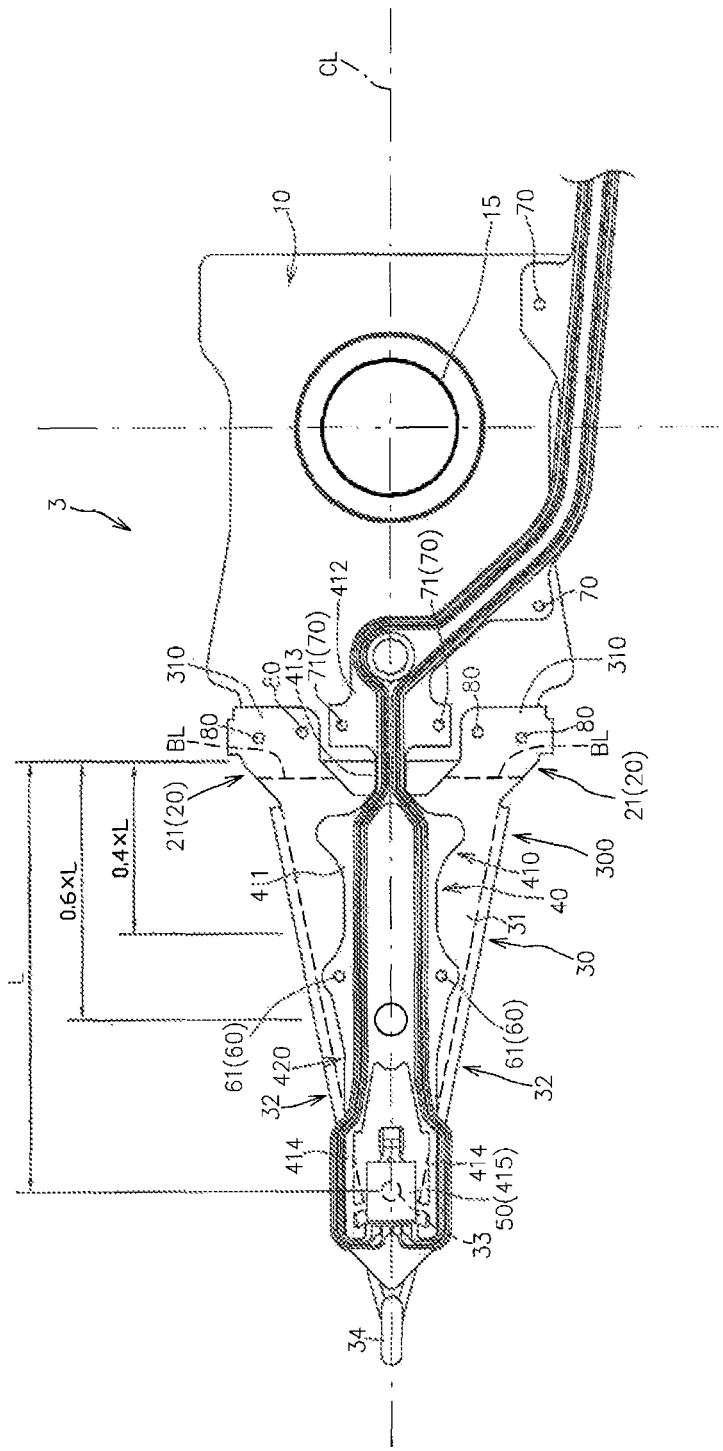
FIG. 9 is a bottom view of the magnetic head suspension according to the third embodiment.

FIGS. 8 and 9 are a top view and a bottom view of a magnetic head suspension 3 according to the present embodiment, respectively.

Figure 10A:
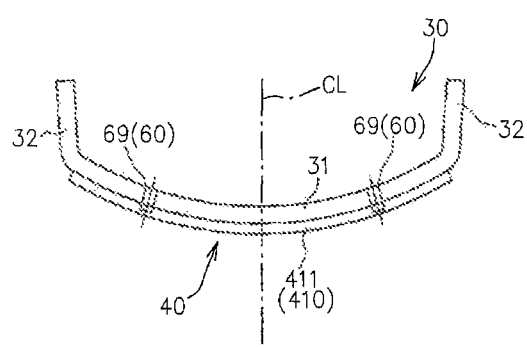
FIGS. 10A and 10B are cross sectional views taken along line Xa-Xa and line Xb-Xb in FIG. 8, respectively.
Figure 10B:
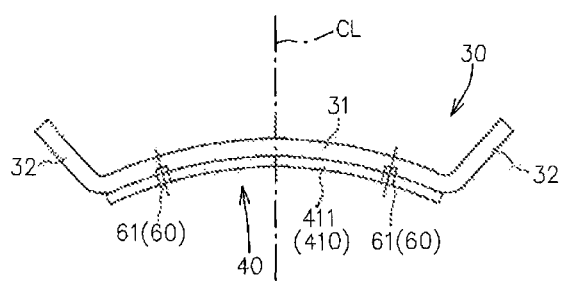

FIGS. 10A and 10B are cross sectional views taken along lines Xa-Xa and Xb-Xb in FIG. 8, respectively.

In the figures, the components same as those in the first and second embodiments are denoted by the same reference numerals to omit the detailed description thereof.

The magnetic head suspension according to the present embodiment is different from the magnetic head suspension according to the first embodiment in that a direction of the spot welding at the paired main welding points and a direction of the spot welding at the paired load beam part proximal-side welding points are different from each other.

More specifically, as shown in FIG. 2, in the magnetic head suspension according to the first embodiment, both the spot welding at the paired main welding points 61 and the spot welding at the load beam part proximal-side welding points 69 are made from the side of the flexure base plate 410.

On the other hand, as shown in FIGS. 8 and 9, in the magnetic head suspension according to the present embodiment, the spot welding at the paired main welding points 61 are made from the side of one of the flexure base plate 410 or the main body portion 31, while the spot welding at the load beam part proximal-side welding points 69 are made from the side of the other one of the flexure base plate 410 or the main body portion 31.

Specifically, as shown in FIG. 9, in the present embodiment, the spot welding at the paired main welding points 61 are made from the side of the flexure base plate 410, while the spot welding at the load beam part proximal-side welding points 69 are made from the side of the main body portion 31.

In this configuration, the combined component of the load beam part 30 and the flexure base plate 410 is bent so as to be convex toward the disk surface at a cross section passing the paired load beam part proximal-side welding points 69 (see FIG. 10A), while being bent so as to be convex toward the direction opposite from the disk surface at a cross section passing the main welding points 61 (see FIG. 10B).

The present embodiment also can enhance the rigidity of the magnetic head suspension 3 without increase of the manufacturing process and increase of the mass, thereby raising the resonant frequency, especially the resonant frequencies of the first bending mode and the first torsion mode, of the magnetic head suspension 3.

In the present embodiment, it is possible to make the direction of the spot welding at the paired main welding points 61 and the direction of the spot welding at the paired load beam part proximal-side welding points 69 different from each other by doing the spot welding at the main welding points 61 from the side of the main body portion 31 while doing the spot welding at the paired load beam part proximal-side welding points 69 from the side of the flexure base plate 410.

The present embodiment has been explained with taking as an example a case where the technical idea of making the direction of the spot welding at one welding point and the direction of the spot welding at the other one welding point different from each other is applied to the magnetic head suspension according to the first embodiment. However, it is also possible to apply the technical idea to the magnetic bead suspension according to the second embodiment.

That is, the spot welding at the center welding point 65, the paired distal-side welding points 66 and the paired proximal-side welding points 67 (hereinafter, referred to as welding points near the center in the suspension longitudinal direction) can be made from the side of one of the flexure base plate 410 or the main body portion 31, while the spot welding at the load beam part proximal-side welding points 69 can be made from the side of the other one of the flexure base plate 410 of the main body portion 31.

More specifically, the spot welding at the welding points near the center in the suspension longitudinal direction can be made from the side of the flexure base plate 410, while the spot welding at the load beam part proximal-side welding points 69 can be made from the side of the main body portion 31.

Alternatively, the spot welding at the welding points near the center in the suspension longitudinal direction can be made from the side of the main body portion 31, while the spot welding at the load beam part proximal-side welding points 69 can be made from the side of the flexure base plate 410.

What is claimed is:

1. A magnetic head suspension comprising a supporting part that is swung around a swing center in a seek direction parallel to a disk surface directly or indirectly by an actuator, a load bending part that has a proximal end portion connected to the supporting part and generates a pressing load for pressing a magnetic head slider toward the disk surface, a load beam part that has a proximal end portion supported through the load bending part by the supporting part and transmits the pressing load to the magnetic head slider through a dimple provided at a distal side thereof, and a flexure part that is fixed to the load beam part and the supporting part while supporting the magnetic head slider, wherein the load beam part has a plate-like main body portion that is disposed substantially parallel to the disk surface, wherein flexure part has a plate-like flexure base plate that is disposed substantially parallel to the disk surface, wherein the flexure base plate includes a load beam part fixed region that is fixed to a disk-facing surface of the main body portion, wherein the load beam part fixed region and the main body portion are fixed to each other by spot welding at plural load beam part welding points, and wherein assuming that a length in the suspension longitudinal direction between a distal edge of the supporting part and the dimple is represented by "L", the plural load beam part welding points include paired right and left main welding points that are arranged symmetrically to each other with respect to the suspension longitudinal center line and that are disposed within a center region away from the distal edge of the supporting part by more than or equal to 0.4*L and less than or equal to 0.6*L.

2. A magnetic head suspension according to claim 1, wherein the plural load beam part welding points include paired right and left load beam part proximal-side welding points that are disposed on the proximal side of the paired main welding points in the suspension longitudinal direction and that are arranged symmetrically to each other with respect to the suspension longitudinal center line, and wherein the spot welding at the paired main welding points are made from a side of one of the flexure base plate or the main body portion, while the spot welding at the paired load beam part proximal-side welding points are made from a side of the other one of the flexure base plate or the main body portion.

3. A magnetic head suspension according to claim 1, wherein the plural load beam part welding points include paired right and left load beam part proximal-side welding points that are disposed on the proximal side of the paired main welding points in the suspension longitudinal direction and that are arranged symmetrically to each other with respect to the suspension longitudinal center line, and wherein the spot welding at the paired main welding points and the spot welding at the paired load beam part proximal-side welding points are made from the same side of the flexure base plate or the main body portion.

4. A magnetic head suspension according to claim 1, wherein the spot welding at the paired main welding points are made from the side of the flexure base plate.

5. A magnetic head suspension according to claim 1, wherein the plural load beam part welding points include a center welding point that is arranged on the center line and at which the spot welding is made from the same side as the spot welding at the paired main welding points.

6. A magnetic head suspension according to claim 5, wherein the center welding point is arranged on the same position as the paired main welding points in the suspension longitudinal direction.

7. A magnetic head suspension according to claim 5, wherein the center welding point is displaced from the paired main welding points in the suspension longitudinal direction, and wherein the spot welding at the paired main welding points have weld strength higher than that at the center welding point.

8. A manufacturing method of a magnetic head suspension according to claim 7, wherein the center welding point includes a distal-side center welding point and a proximal-side center welding point that are displaced from the paired main welding points toward the distal side and the proximal side in the suspension longitudinal direction, respectively, and wherein the distal-side and proximal-side center welding points are arranged symmetrically to each other with respect to an imaginary line passing the main welding points.

9. A manufacturing method of a magnetic head suspension according to claim 7, wherein the plural load beam part welding points include paired load beam part proximal-side welding points that are disposed on the proximal side of the main welding points in the suspension longitudinal direction and that are arranged symmetrically to each other with respect to the center line, and wherein the center welding point is arranged at the center in the suspension longitudinal direction between the paired main welding points and the paired load beam part proximal-side welding points.

10. A magnetic head suspension comprising a supporting part that is swung around a swing center in a seek direction parallel to a disk surface directly or indirectly by an actuator, a load bending part that has a proximal end portion connected to the supporting part and generates a pressing load for pressing a magnetic head slider toward the disk surface, a load beam part that has a proximal end portion supported through the load bending part by the supporting part and transmits the pressing load to the magnetic head slider through a dimple provided at a distal side thereof, and a flexure part that is fixed to the load beam part and the supporting part while supporting the magnetic head slider, wherein the load beam part has a plate-like main body portion that is disposed substantially parallel to the disk surface, wherein flexure part has a plate-like flexure base plate that is disposed substantially parallel to the disk surface, wherein the flexure base plate includes a load beam part fixed region that is fixed to a disk-facing surface of the main body portion, wherein the load beam part fixed region and the main body portion are fixed to each other by spot welding at plural load beam part welding points, and wherein assuming that a length in the suspension longitudinal direction between a distal edge of the supporting part and the dimple is represented by "L", the plural load beam part welding points includes a center welding point that is arranged on a suspension longitudinal center line and that is disposed within a center region away from the distal edge of the supporting part by more than or equal to 0.4*L and less than or equal to 0.6*L, paired right and left distal-side welding points that are positioned on the distal side of the center welding point and that are arranged symmetrically to each other with respect to the suspension longitudinal center line, and paired right and left proximal-side welding points that are positioned on the proximal side of the center welding point and that are arranged symmetrically to each other with respect to the suspension longitudinal center line, wherein the paired distal-side welding points and the paired proximal-side welding points are arranged symmetrically to each other in the suspension longitudinal direction with respect to the center welding point, and wherein the spot welding at the center welding point, the paired distal-side welding points and the paired proximal-side welding points are made from the same side of the flexure base plate or the main body portion.

11. A manufacturing method of a magnetic head suspension according to claim 10, wherein the plural load beam part welding points include paired right and left load beam part proximal-side welding points that are disposed on the proximal side of the paired proximal-side welding points in the suspension longitudinal direction and that are arranged symmetrically to each other with respect to the center line, and wherein the spot welding at the center welding point, the paired distal-side welding points and the paired proximal-side welding points are made from a side of one of the flexure base plate or the main body portion, while the spot welding at the load beam part proximal-side welding points are made from a side of the other one of the flexure base plate or the main body portion.

12. A manufacturing method of a magnetic head suspension according to claim 10, wherein the plural load beam part welding points include paired right and left load beam part proximal-side welding points that are disposed on the proximal side of the paired proximal-side welding points in the suspension longitudinal direction and that are arranged symmetrically to each other with respect to the center line, and wherein the spot welding at the center welding point, the paired distal-side welding points, the paired proximal-side welding points and the paired load beam part proximal-side welding points are made from the same side of the flexure base plate or the main body portion.

13. A manufacturing method of a magnetic head suspension according, to claim 2, wherein the load bending part includes paired right and left leaf springs that have plate surfaces facing the disk surface and that are disposed away from each other in the suspension width direction, wherein the flexure base plate includes a supporting part fixed region that is fixed to the supporting part by spot welding at plural supporting part welding points in a state of being brought into contact with a disk-facing surface of the supporting part, and a non-fixed region that extends between the paired leaf springs in the suspension width direction and that connects the load beam part fixed region and the supporting part fixed region, wherein the paired load beam part proximal-side welding points are arranged at an area of the load beam part fixed region that is adjacent to the non-fixed region, and wherein the supporting part welding points include paired right and left supporting part distal-side welding points at which an area of the supporting part fixed region that is adjacent to the non-fixed region and the supporting part are welded to each other.

\* \* \* \* \*